Nov. 17, 1953  A. E. LUDGEWAIT  2,659,141
BUTTON REMOVER
Filed July 21, 1950
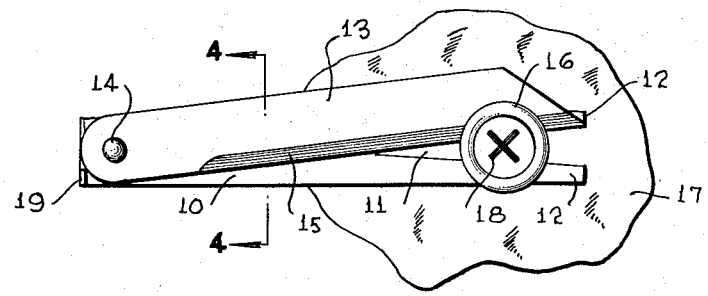
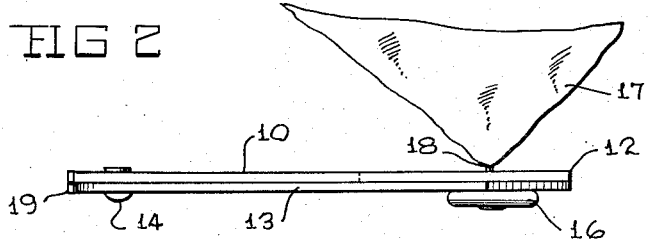
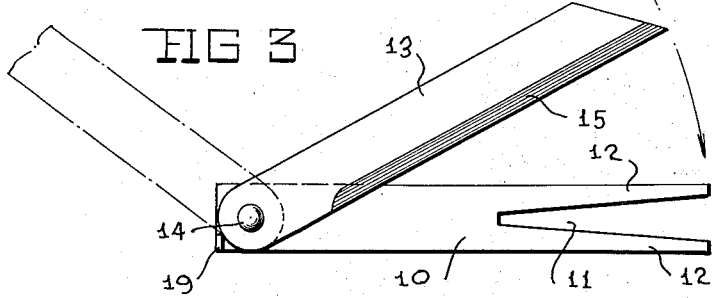
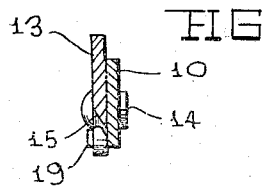
INVENTOR.
ARTHUR E. LUDGEWAIT
BY
McMorrow, Berman & Davidson
ATTORNEYS Patented Nov. 17, 1953

2,659,141

UNITED STATES PATENT OFFICE 2,659,141

BUTTON REMOVER

Arthur E. Ludgewait, Naugatuck, Conn.

Application July 21, 1950, Serial No. 175,095

1 Claim. (Cl. 30—131)

My invention relates to an implement for removing buttons from clothing and the like.

A primary object of the invention is to provide a button remover, so constructed that it severs the threads connecting the button to the clothing, without liability of damaging the clothing or fabric.

A further object is to provide a button remover of the above mentioned character which is highly simplified, compact, easy to manipulate and cheap to manufacture.

A still further object of the invention is to provide a button remover which will accommodate substantially any size button encountered.

Other objects and advantages of the invention will be apparent during the course of the following description.

In the accompanying drawings, forming a part of this application, and in which like numerals are employed to designate like parts throughout the same, Figure 1 is a plan view of a button removing implement embodying my invention and illustrating the use thereof, Figure 2 is a side elevational view of the implement in use, Figure 3 is a plan view of the implement removed, and, Figure 4 is a transverse vertical sectional view taken on line 4—4 of Figure 1.

In the drawings, where for the purpose of illustration is shown a preferred embodiment of my invention, the numeral 10 designates an elongated flat forked blade or button tensioner which is substantially rigid, and provided in one end with an elongated substantially V-shaped opening or notch 11, forming side elongated extensions or lifting arms 12, integral therewith. The inner opposed longitudinal edges of the arms 12 converge longitudinally rearwardly of the forward or free ends of the arms 12, as shown.

A button cutting or shearing blade 13 is provided, and has its rear end pivotally secured to the rear end of the forked blade 10 by a single rivet 14 or the like. The shearing blade 13 has preferably the same over-all length and width as the blade 10, and is substantially flat, as shown. The opposed faces or sides of the blades 10 and 13 are arranged in sliding contact, and one longitudinal edge of the shearing blade 13 is beveled to provide a straight longitudinal cutting edge 15, extending from the forward or free end of the blade 13 to a point near and forwardly of the rivet 14. The beveled or cutting edge 15 is inclined upwardly or away from the companion forked blade 10 (Figure 4), so that the cutting or shearing takes place adjacent to the opposed flat contacting faces of the blades 10 and 13. The cutting blade 13 is preferably pointed at its forward or free end, as shown, so that the cutting blade may also serve for opening or slitting seams and the like.

As shown in Figure 3, the blade 13 may be swung to the dotted line position thereof when said blade is to serve for opening or slitting seams and the like. The blade 10 is provided at its rear end with a laterally extending lug 19 which serves as a stop element restraining the blade 13 from being rotated beyond the dotted line position thereof, which dotted line position is at an obtuse angle to the blade element 10. The blade element 10 may therefore be employed as a handle for the cutting blade 13 when the device is employed for opening or slitting seams and the like.

In use, the cutting blade 13 is swung away from the forked or lifting blade 10 (Figure 3), and the lifting arms 12 are introduced beneath a button 16, connected to an article of clothing 17 or the like, by means of the usual thread 18. The extensions or arms 12 straddle the button attaching thread 18, as shown, and engage the under side of the button for lifting it from the clothing or fabric 17 and tensioning the attaching thread 18. While the button is thus lifted away from the clothing 17, and the thread 18 tensioned, the shearing blade 13 is swung closed (Figure 1), and the cutting edge 15 will shear the attaching thread 18 close to the fabric 17, without damaging the clothing or fabric in any manner. When the severing blade 13 is shifted to the closed or severing position, the inclined or beveled edge 15 engages the periphery or marginal edge of the button 16 and further lifts the button away from the fabric 17 and above the lifting blade 10, so that the severing blade 13 may pass between the button and lifting blade, as shown. The actual severing of the attaching thread 18 thus takes place between the button 16 and lifting blade 10 (Figure 2), and the fabric 17 is positioned adjacent to the under side of the lifting blade 10 or its side remote from the cutting blade 13, so that there is no liability of the cutting blade injuring the fabric 17. The edges of the V-shaped opening or notch 11 forming the arms 12 are straight and perpendicular to the opposite flat faces of the lifting blade 10, so that a pure shearing action can be had between the cutting edge 15 and one of the arms 12. It is merely necessary to apply a slight squeezing or gripping pressure to the cutting blade 13, for causing it to shear the thread 18, and the cutting edge 15 is preferably sharpened or ground to a razor-like edge.

Since the opening 11 is substantially V-shaped, the lifting arm 10 will accommodate substantially any size button having attaching threads 18 of substantially any size or diameter. My button remover is highly simplified, and very easy to manipulate. Buttons may be removed from old clothing and the like with great speed and without liability of damaging the cloth or fabrics.

It is to be noted that the lifting blade 10 is formed with straight, parallel, longitudinal side edges, said side edges being straight and parallel from end to end of the lifting blade. The same is true of the severing blade. Further, it may be observed that the side edges of the severing blade 13 are so spaced apart as to form the severing blade to the same width as the lifting blade. Still further, it is believed worthy of note that the pivotal connection of the blades to one another is disposed medially between the opposite side edges of the respective blades, as may be noted from Figure 3, the elongated V-shaped notch of the lifting blade also being disposed medially between the side edges of the lifting blade, that is, longitudinally and centrally of the lifting blade. The arrangement is one which permits the blades, in the fully closed position of the device, to be in full registration, with the opposite sides thereof being flush with one another, thus to form a compact device which will occupy little space in a sewing kit, or the like. Further, the arrangement wherein the respective blades move into exact longitudinal alignment with their side edges in flush relation permits the user to grasp the device in one hand, with the blades spread as in Figure 3, and with a button engaged in the slot 11. Thereafter, the user simply presses the blades toward one another, until, as the blades begin to swing into longitudinal alignment, the button is severed by movement of the cutting edge of the severing blade 13 past one edge of the notch 11, continued movement of the blade 13 being effective to swing the same into full longitudinal alignment with the lifting blade 10.

It is to be understood that the form of the invention herewith shown and described is to be taken as a preferred example of the same, and that various changes in shape, size and arrangement of parts may be resorted to, without departing from the spirit of the invention or the scope of the subjoined claim.

Having thus described the invention, I claim:

An implement for slitting seams and for removing buttons connected with a section of fabric by attaching threads, comprising a substantially flat elongated lifting blade and handle element having straight parallel side edges from end to end and provided in one end with a V-shaped opening extending longitudinally and centrally of said element, said opening forming spaced lifting arms for engagement beneath a button, a substantially flat elongated severing and slitting blade arranged adjacent one face of the lifting blade and slidably contacting the same, said blade having straight parallel side edges from end to end, said lifting blade and handle element and said severing and slitting blade being of the same length and width, said element being pivotally connected at its other end to said blade, and a lug formed on said other end of the element adjacent the pivotal connection and projecting into the path of swinging movement of the blade, said lug being so disposed as to limit swinging movement of the blade in one direction beyond one extreme position in which it is disposed at an obtuse angle to the element for slitting seams, and a second position in which it traverses said lifting arms, the blade having a cutting edge formed along one side edge thereof for coaction with one of said lifting arms to sever the attaching thread between the button and said element when the blade is swung to said second position.

ARTHUR E. LUDGEWAIT.

References Cited in the file of this patent

UNITED STATES PATENTS

| Number | Name | Date |
|--------|------|------|
| 601,943 | Burke | Apr. 5, 1898 |
| 1,387,214 | Wackwitz | Aug. 9, 1921 |
| 2,142,738 | Wakeley | Jan. 3, 1939 |